(12) United States Patent
Koreeda et al.

(10) Patent No.: US 8,360,660 B2
(45) Date of Patent: Jan. 29, 2013

(54) OPTICAL MODULE

(75) Inventors: Yuichi Koreeda, Tokyo (JP); Masashi Hiraki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 98 days.

(21) Appl. No.: 13/174,767

(22) Filed: Jun. 30, 2011

(65) Prior Publication Data
US 2012/0106895 A1 May 3, 2012

(30) Foreign Application Priority Data
Oct. 27, 2010 (JP) .................................. 2010-240533

(51) Int. Cl.
*G02B 6/38* (2006.01)
(52) U.S. Cl. ................ 385/71; 385/53; 385/55; 385/70; 385/72; 385/73
(58) Field of Classification Search .................... 385/53, 385/55, 70, 71, 72, 73, 75
See application file for complete search history.

(56) References Cited

U.S. PATENT DOCUMENTS

| 6,056,448 | A  | * | 5/2000 | Sauter et al. | 385/92 |
| 7,404,680 | B2 | * | 7/2008 | Ono et al. | 385/88 |
| 7,665,905 | B2 | * | 2/2010 | Tamura et al. | 385/88 |

FOREIGN PATENT DOCUMENTS

JP    2000-199838    7/2000

* cited by examiner

*Primary Examiner* — Jennifer Doan
(74) *Attorney, Agent, or Firm* — David N. Lathrop

(57) ABSTRACT

An optical module 10 include a substrate 11, a holding member 12 of resin that is secured to the substrate 11, has a pair of through holes 21 drilled through the substrate 11 in a direction orthogonal to the upper surface 11a, and the entire length L in the direction orthogonal to the upper surface 11a is at least 1.9 mm and less than 2.8 mm, and a pair of guide pins 13 that are inserted into the through holes 21 and secured to the holding member 12 by locking pieces 14, in which one end section of each of the guide pins 13 is held by the holding member 12 across the entire length L and the other end section to be inserted into one of guide pin insertion holes 32 of the MT connector 30 projects 2.8 mm or more from the holding member 12. This structure downsizes the optical module connected to an MT connector.

10 Claims, 13 Drawing Sheets

OPTICAL MODULE

TECHNICAL FIELD

The present invention relates to an optical module connected to an optical fiber connector that holds an optical fiber and, more particularly, to an optical module connected to an F12 type multi-core optical fiber connector (referred to below as an MT connector) standardized in JIS (Japanese Industrial Standard) C 5981.

BACKGROUND ART

Japanese Patent Application Laid Open No. 2000-199838 (referred to below as the patent literature 1) proposes, as a prior-art optical module of this type, an optical module formed in a mold package created by resin-molding of a lead frame and a subassembly including a pair of guide pins, an MT ferrule for holding a multi-core optical fiber, and a PD subcarrier for holding a photoreceptor.

FIG. 1A shows the structure of the subassembly of the optical module proposed in the patent literature 1; reference numeral 1 indicates guide pins, reference numeral 2 indicates an MT ferrule, and reference numeral 3 indicates a PD subcarrier. FIG. 1B shows the optical module in which the MT ferrule 2 has been removed from the subassembly.

The MT ferrule 2 includes a combination of a lid 2c and a fiber holding member 2d. There are trapezoidal grooves forming a pair of through holes 2a that house the guide pins 1 in each of the mutually facing surfaces of the lid 2c and the fiber holding member 2d; a plurality of V-shaped grooves 2b for holding optical fibers are formed between the two trapezoidal grooves in the fiber holding member 2d. The lid 2c and the fiber holding member 2d are bonded to each other across the optical fibers. Then, the guide pins 1 are inserted into the through holes 2a.

The PD subcarrier 3 includes a first plate 3b and a second plate 3c, which form a pair of through holes 3a, and a lead frame, which has heatsink lead pins 3d and connection lead pins 3e as a part and is sandwiched between the first plate 3b and the second plate 3c. The PD subcarrier 3 incorporates a photoreceptor array 3f and a preamplifier IC 3g.

The MT ferrules 2 precisely positions all optical fibers based on the through holes 2a into which the guide pins 1 are inserted and the PD subcarrier 3 precisely positions all photoreceptors of the photoreceptor array 3f based on the through holes 3a into which the guide pins 1 are inserted. Accordingly, only if the guide pins 1 are inserted into the through holes 2a and 3a, the optical fibers held by the MT ferrule 2 and the photoreceptors of the photoreceptor array 3f incorporated in the PD subcarrier 3 are positioned precisely.

The guide pins 1 project from the MT ferrule 2 as shown in FIG. 1A and are inserted into the corresponding MT connector to which this optical module is connected.

As described above, the guide pins 1 projecting from the MT ferrule 2 are used to make connection with the corresponding MT connector or optical axis alignment. The amount of projection of the guide pins 1 from the MT ferrule 2 and the guide pin hold length in the patent literature 1 are calculated as follows from the standard (JIS C 5981) of the MT connector.

In the JIS C 5981 standard, the guide pin length is defined as 10.8 mm or greater and the length (guide pin hole length into which the guide pin is inserted) in the guide pin insertion direction of the MT ferrule is defined as 8.0 mm. FIG. 2A illustrates the standard; reference numeral 5 shows the guide pins, the reference numeral 6 shows the MT ferrules, and reference numeral 6a shows the guide pin holes. Optical fibers are not shown in this drawing.

Since the guide pin length and the guide pin hole length are defined as show above, in the state where the guide pins 5 mate with the MT ferrule 6, the amount of projection of the guide pins is always 2.8 mm or greater, as shown in FIG. 2B. That is, the guide pin hold length when two MT ferrules 6 are mutually connected via the guide pins 5 is at least 2.8 mm as shown in FIG. 2C. Part of FIGS. 2B and 2C is shown transparently (this is the same as in FIGS. 3A and 3B described later).

Since the guide pins are not secured to any of the MT ferrules, the guide pins can move in the optical axis direction even when the MT connector is connected. Accordingly, the guide pin length is determined so that the guide pin hold length and the amount of projection of the guide pins enough for connection and optical axis alignment can be taken even if the guide pins move more or less.

Similarly, in the optical module in the patent literature 1 that is connected to an MT connector, the guide pins 1 are not secured to the MT ferrule 2. Therefore, the technical common sense of those skilled in the art was that the guide pins 1 should be at least 5.6 mm (2.8 mm+2.8 mm) in length and the MT ferrule 2 should be at least 2.8 mm in length as shown in FIGS. 3A and 3B even when the guide pins 1 and the MT ferrule need to be reduced in length for downsizing of the optical module.

SUMMARY OF THE INVENTION

An object of the present invention is to provide a compact optical module that can be connected to an MT connector even when the guide pins and MT ferrule of the optical module are shorter than before.

According to the present invention, an optical module that is connected to an MT connector that arranges and holds optical fibers and having a pair of guide pin insertion holes, includes a substrate, a holding member of resin that is secured to the substrate, has a pair of through holes drilled through the substrate in a direction orthogonal to an upper surface of the substrate, and has an entire length in the direction of at least 1.9 mm and less than 2.8 mm, and a pair of guide pins that are inserted into the through holes and secured to the holding member by locking pieces, in which one end section of each of the pair of guide pins is held by the holding member across the entire length and the other end section to be inserted into one of the pair of guide pin insertion holes projects 2.8 mm or more from the holding member.

The optical module according to the present invention locks and secures the guide pins using the locking piece so that the entire length of the holding member for holding the guide pins is at least 1.9 mm and less than 2.8 mm, thereby downsizing the optical module.

DETAILED DESCRIPTION OF THE EMBODIMENTS

Embodiments of the present invention will be described below.

First Embodiment

Figure 1A:
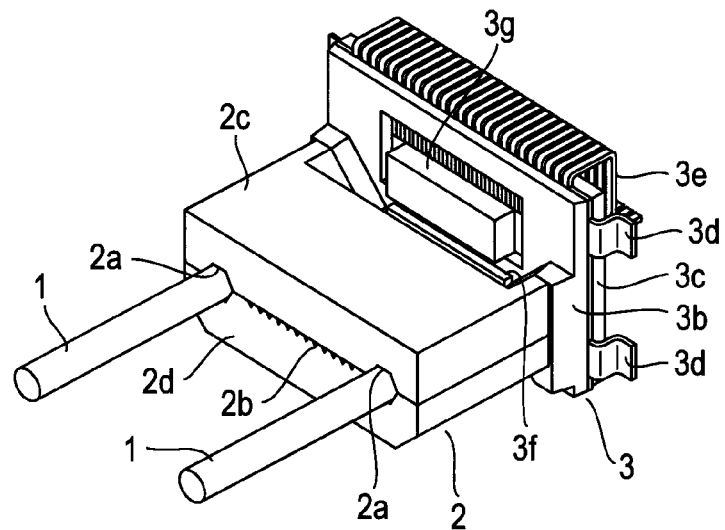
FIG. 1A is a perspective view showing the structure of the key part of a conventional optical module.
Figure 1B:
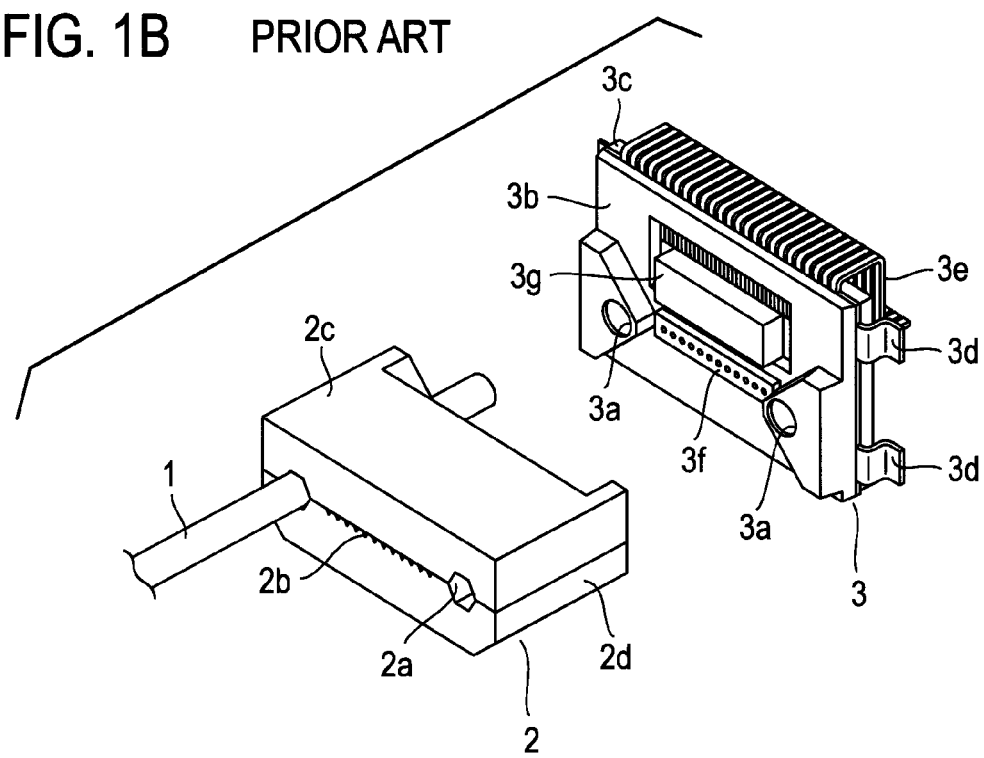
FIG. 1B is an exploded perspective view showing the structure in FIG. 1A.
Figure 2A:
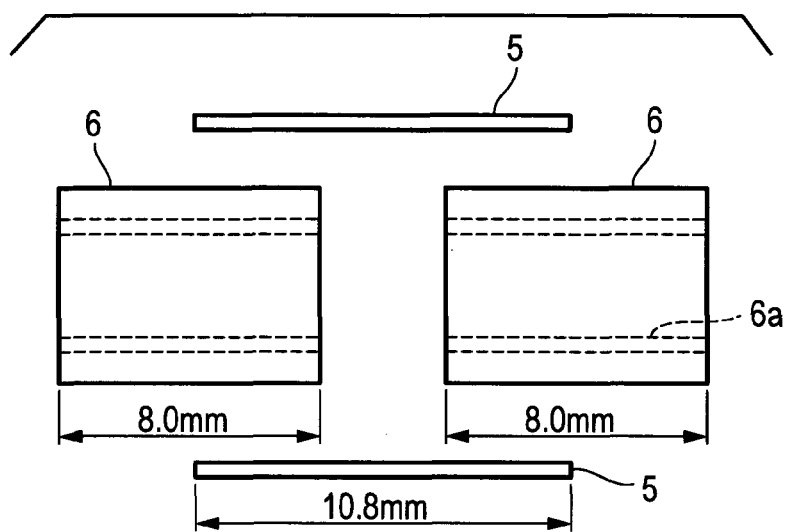
FIG. 2A shows the dimensions of components included in an MT connector.
Figure 2B:
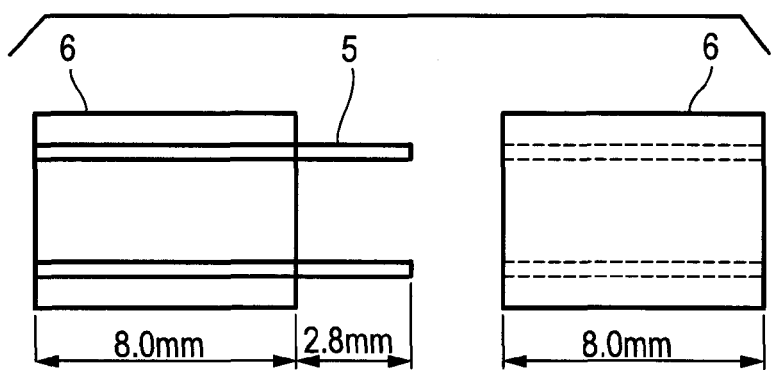
FIG. 2B shows the dimensions when guide pins are combined with MT ferrules.
Figure 2C:
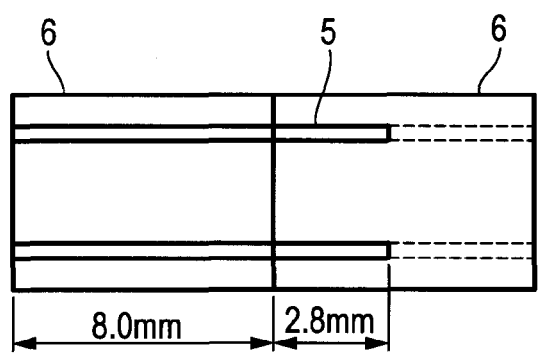
FIG. 2C shows the connection state of the MT connector.
Figure 3A:
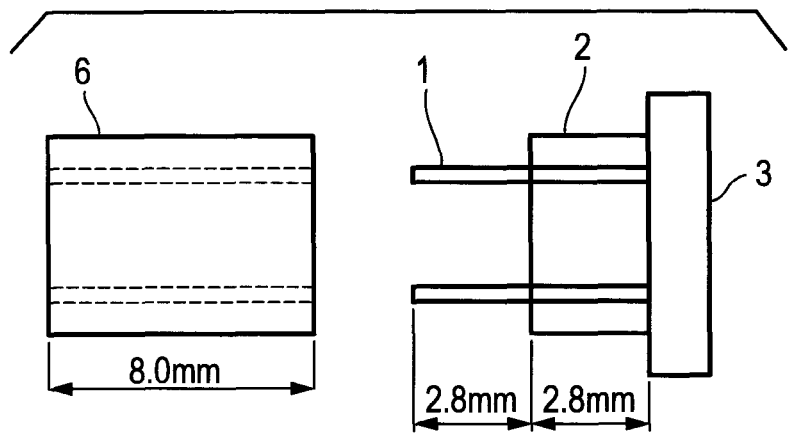
FIG. 3A shows the dimensions of the conventional optical module in FIG. 1A and an MT connector.
Figure 3B:
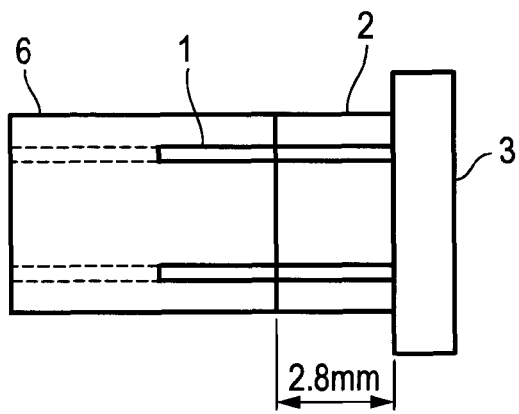
FIG. 3B shows the connection state of the conventional optical module in FIG. 1A and the MT connector.
Figure 4:
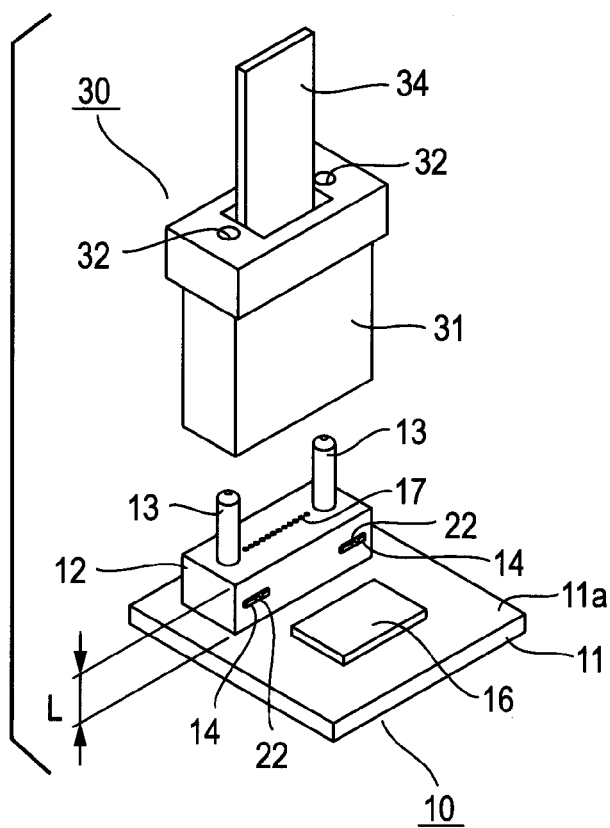
FIG. 4 is a perspective view showing the appearance of an optical module according to a first embodiment of the present invention and an MT connector.
Figure 5:
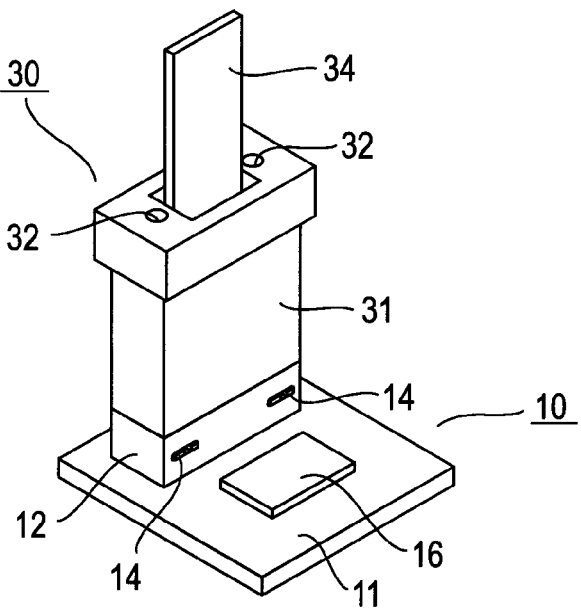
FIG. 5 is a perspective view showing the optical module and the MT connector in FIG. 4 when they have been mutually connected.
Figure 6A:
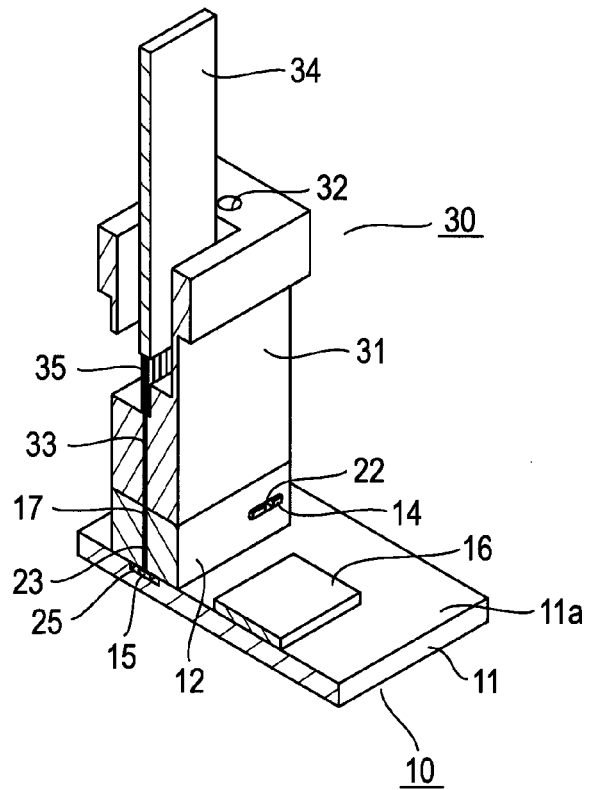
FIG. 6A is an enlarged cross-sectional view of the optical module and the MT connector in FIG. 5.
Figure 6B:
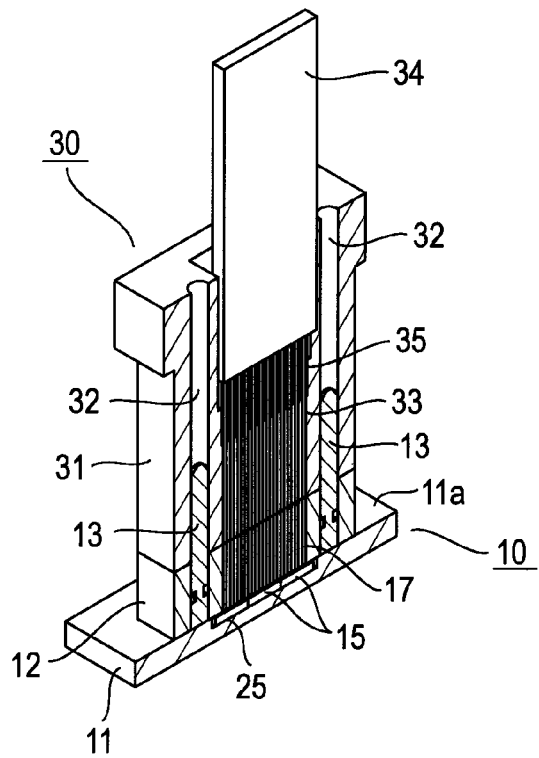
FIG. 6B is an enlarged cross-sectional view of the optical module and the MT connector in FIG. 5.
Figure 7:
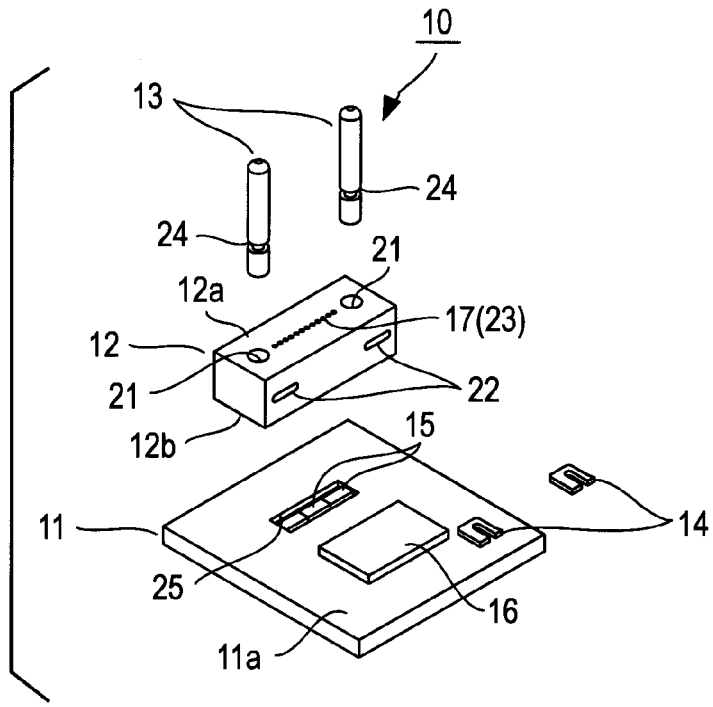
FIG. 7 is an exploded perspective view showing the optical module in FIG. 4.

FIG. 4 shows the structure of an optical module according to a first embodiment of the present invention and an MT connector; FIG. 5 shows their connection state. FIGS. 6A and 6B is a cross-sectional view showing the optical module and the MT connector when they have been mutually connected; FIG. 7 is an exploded perspective view showing the optical module.

An optical module 10 in this example includes a substrate 11, a holding member 12, a pair of guide pins 13, a pair of locking pieces 14 as shown in FIG. 7. An optical element 15 and an IC 16 are mounted on the substrate 11 and optical fibers 17 are arranged and held by the holding member 12.

The holding member 12 is rectangular parallelepiped-shaped and has a pair of two through holes 21, which are drilled vertically through the holding member 12, on both ends in the longitudinal direction. The holding member 12 has a pair of slits 22 on one surface extending in the longitudinal direction and the inner ends of the slits 22 communicate with the through holes 21.

The optical fibers 17 are inserted into and secured by small holes 23, which are drilled through the holding member 12 in the vertical direction between the through holes 21. In this example, 12 optical fibers 17 are arranged and held by the holding member 12. The optical fibers 17 are inserted into the small holes 23 so as to have a longer entire length than the small holes 23 and bonded to and secured by the holding member 12, and an upper surface 12a and a lower surface 12b of the holding member 12 are ground to remove projections to justify their ends. The ground ends of optical fibers 17 are flush with the upper surface 12a and the lower surface 12b of the holding member 12.

The guide pins 13 are inserted into the through holes 21 of the holding member 12. A notch 24 is formed in a position close to one end of each of the guide pins 13 inserted into the through holes 21. When the locking pieces 14 inserted into the slits 22 mate with the notches 24, the guide pins 13 are locked and secured by the holding member 12 in this example.

Figure 8A:
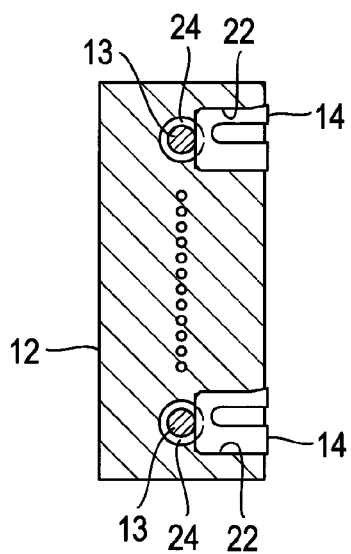
FIG. 8A is a cross-sectional view showing the state where locking pieces mate with guide pins.
Figure 8B:
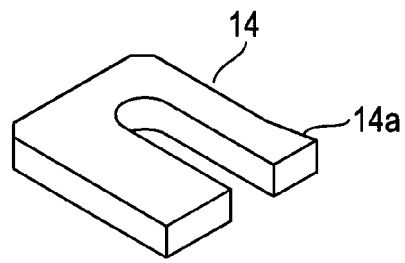
FIG. 8B is an enlarged perspective view of the locking piece.

FIG. 8A shows the state where the locking pieces 14 mate with the notches 24 of the guide pins 13 and FIG. 8B is an enlarged view of one of the locking pieces 14.

The locking piece 14 is U-shaped and a projection 14a is disposed on the tip of one leg of the U-shaped piece so as to face outward. On the other hand, the notch 24 of the guide pin 13 in this example is formed by reducing the diameter of the guide pin 13. The locking piece 14 press-fits into the slit 22 of the holding member 12 and is held by the holding member 12, and the inner end of the locking piece 14 held by the holding member 12 positions within the notch 24 of the guide pin 13 to lock the guide pin 13.

The holding member 12 to which the guide pins 13 are secured are placed and secured to the substrate 11. This fixation is performed by, for example, adhesion. In this example, the optical element 15 is placed on a concave section 25 formed in an upper surface 11a of the substrate 11, and optical axis adjustment is made by letting the end faces (the end faces facing the substrate 11) of the optical fibers 17 arranged and held by the holding member 12 face the optical element 15.

The optical element 15 is a photoreceptor when the optical module 10 is a light-receiving module; the optical element 15 is a light-emitting device when the optical module 10 is a light-emitting module. More specifically, a photodiode (PD) or the like is used as a photoreceptor, and a vertical-cavity surface-emitting laser (VCSEL) or the like is used as a light-emitting device. This example has three optical elements 15, each of which includes an array of four light-emitting units or light-receiving units. The IC 16 is an amplification circuit when the optical module 10 is a light-receiving module; the IC 16 is a driving circuit when the optical module 10 is a light-emitting module.

In the optical module 10, the holding member 12 having the guide pins 13 is mounted on the substrate 11 as shown above. The guide pins 13 are disposed, on the substrate 11, orthogonal to an upper surface 11a of the substrate 11. The guide pins 13 are made of stainless steel or the like and the holding member 12 is made of resin or the like. Heat-hardening resin such as epoxy resin is used for the holding member 12. Stainless steel for springs or the like is used for the locking piece 14.

An MT connector 30 has the structure defined in JIS C 5981 and has an MT ferrule 31 at its connection end. A pair of guide pin insertion holes 32 are drilled through the MT ferrule 31 and optical fibers 33 are arranged and held between the guide pin insertion holes 32 as shown in FIG. 6B. The optical fibers 33 are arranged and held by the MT ferrule 31 so that their end faces face and optically connect to the end faces of the optical fibers 17, which are arranged and held by the holding member 12 of the optical module 10. In this example, 12 optical fibers 33 are arranged and held as in the optical fibers 17. These optical fibers 33 extend from a tape type optical fiber code 34. In FIG. 6B, reference numeral 35 indicates optical fiber cores.

The guide pins 13 of the optical module 10 are inserted into and positioned by the guide pin insertion holes 32 of the MT connector 30, so that the MT connector 30 and the optical module 10 are mechanically and optically connected to each other.

In the above structure, the entire length L of the holding member 12 of the optical module 10 in a direction orthogonal to the upper surface 11a of the substrate 11 is 1.9 mm in this example. Since one end section of the guide pin 13 is held by the holding member 12 across entire length L of the holding member 12, the hold length of the guide pin 13 is 1.9 mm in this example.

Although the hold length of the guide pin is 2.8 mm or more in the prior art, the hold length in this example is 1.9 mm. The reason why the hold length is 1.9 mm will be described below.

Figure 9:
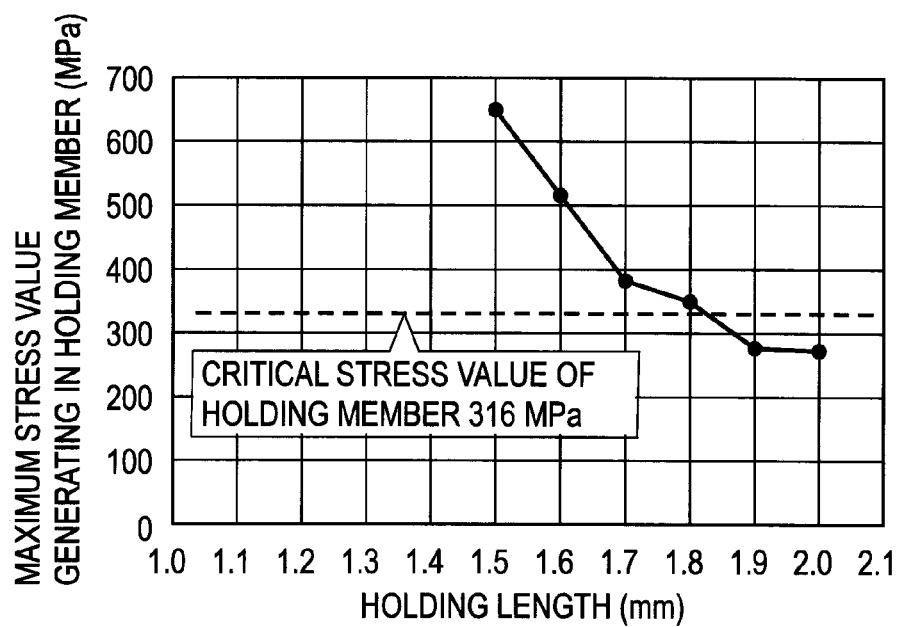
FIG. 9 is a graph showing the results of simulation for obtaining the relationship between the hold length of the guide pins and the maximum stress value generating in the holding member when a bending load is applied to the guide pins.

FIG. 9 shows the results of simulation (FEM analysis) for obtaining the relationship between the hold length of the guide pin and the maximum stress value generating in the holding member when a bending load is applied to the guide pin. The holding member is assumed to be made of epoxy resin, which is generally used for MT connectors, and the following physical properties were used.

Young's modulus: 28000 MPa
Poisson's ratio: 0.4
Yield stress: 200 MPa
Work hardening coefficient: 4000 MPa The guide pins are assumed to be made of stainless steel, which is generally used for guide pins of MT connectors, and the diameter is assumed to be 0.699 mm based on the standard.

According to the graph, when the guide pins project 2.8 mm from the holding member and a bending load is applied to the tips of the guide pins, the critical stress value of the holding member is not exceeded when the hold length is 1.9 mm. However, the critical stress value is exceeded and the holding member is broken when the hold length is 1.8 mm.

Accordingly, when the hold length of the guide pins is 1.9 mm, the holding strength of the holding member is sufficient for the bending load applied to the guide pins.

In the above embodiment, since the guide pins 13 are secured to the holding member 12 by locking pieces 14, which can surely reserve the hold length, the entire length L of the holding member 12 may be 1.9 mm, thereby downsizing the optical module in this example. It is desirable that the slits 22 into which the locking pieces 14 are inserted be positioned in the middle (length L/2) of the entire length L of the holding member 12 in terms of strength.

On the other hand, the amount of projection of the guide pins 13 from the holding member 12 should be 2.8 mm or more, as defined in the standard. The length (1.9 mm+2.8 mm or more=4.7 mm or more) of the guide pins 13 in this example is shorter than the specification (10.8 mm or more).

Since the guide pins 13 are secured by the locking pieces 14, the guide pins 13 are not removed from the through holes 21 of the holding member 12.

Second Embodiment

Figure 10A:
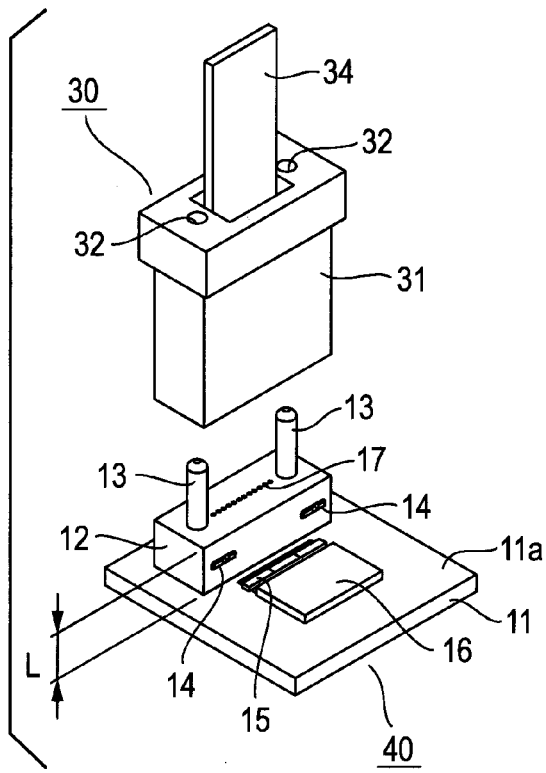
FIG. 10A is a perspective view showing the appearance of an optical module according to a second embodiment of the present invention and an MT connector.
Figure 10B:
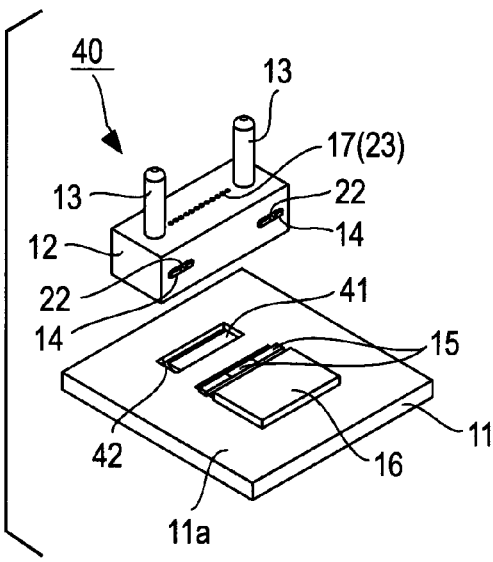
FIG. 10B is an exploded perspective view of the optical module in FIG. 10A.
Figure 11:
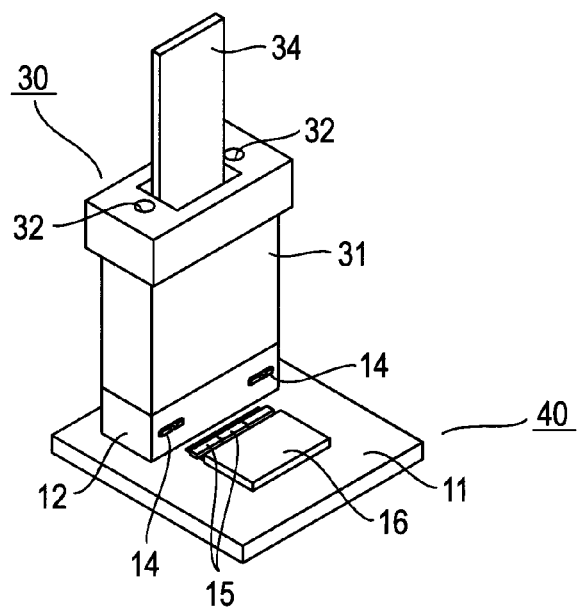
FIG. 11 is a perspective view showing the optical module and the MT connector in FIG. 10A when they have been mutually connected.
Figure 12A:
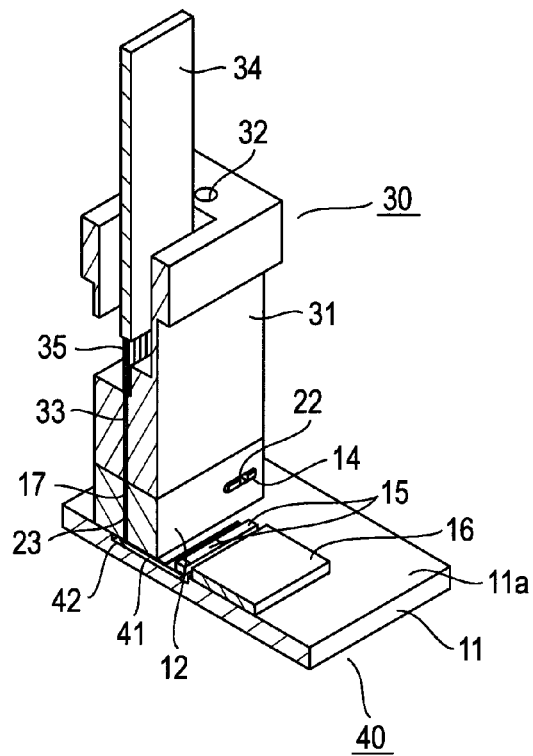
FIG. 12A is an enlarged cross-sectional view of the optical module and the MT connector in FIG. 11.
Figure 12B:
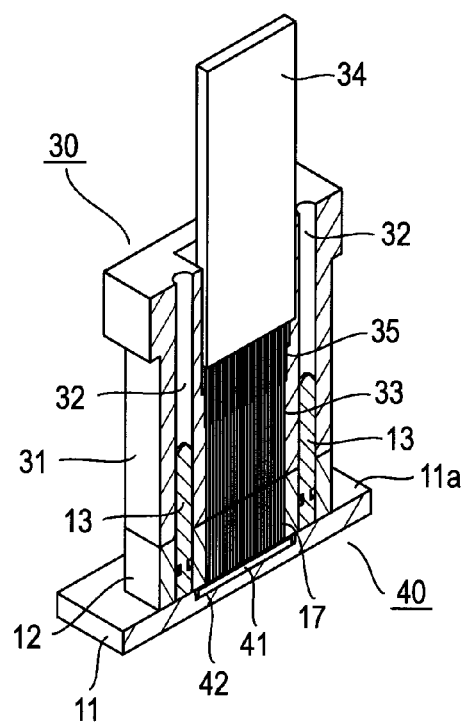
FIG. 12B is an enlarged cross-sectional view of the optical module and the MT connector in FIG. 11.
Figure 12C:
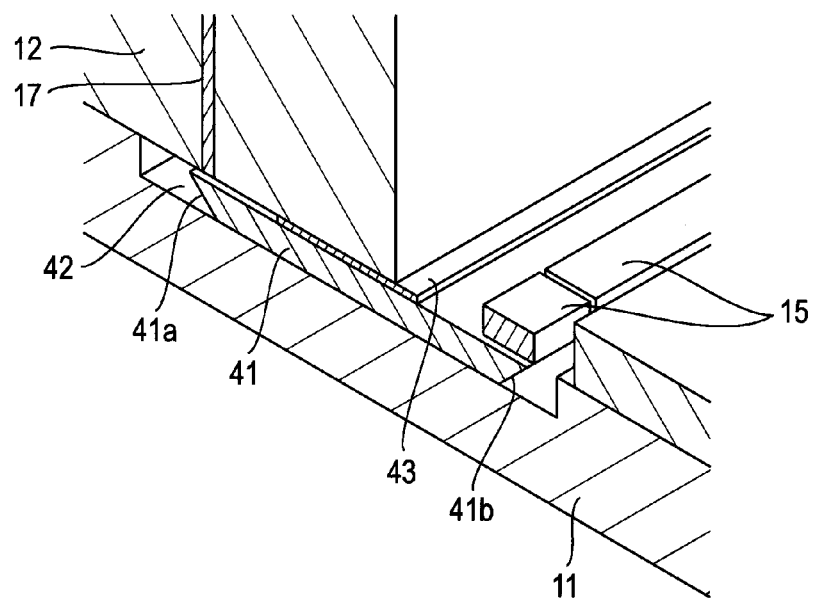
FIG. 12C is an enlarged view of a part of the connection of the optical module and the MT connector in FIG. 12A.

FIG. 10A shows the structure of an optical module according to a second embodiment of the present invention and an MT connector; FIG. 10B shows the optical module that has been partially dismantled. FIG. 11 shows the optical module and the MT connector when they have been mutually connected; FIGS. 12A, 12B, and 12C show the cross sections of the optical module and the MT connector when they have been mutually connected. Elements in FIGS. 10A, 10B, 11, 12A, 12B, and 12C that correspond to elements in FIGS. 4, 5, 6A, 6B, and 7 have the same reference numerals (this is the same as in the third, and fourth embodiments described later).

In this example, an optical waveguide 41 is disposed in the substrate 11 of the optical module 40. The optical waveguide 41 is film-like in this example and is pasted to a concave section 42 formed in the substrate 11.

As shown in FIG. 12C, 45-degree slopes 41a and 41b are formed on both sides in the extension direction of the optical waveguide 41, and the end faces of the optical fibers 17 arranged and held by the holding member 12 are positioned above one slope 41a and the optical elements 15 are positioned above the other slope 41b.

In this example, the optical fibers 17 are optically connected to the optical elements 15 through the optical waveguide 41. Although only the appearance of the optical waveguide 41 is shown in this example with detailed illustration omitted, the optical waveguide 41 has 12 optical waveguide cores through which the 12 optical fibers are optically connected to the optical elements 15. Reference numeral 43 in FIG. 12C indicates a spacer.

Third Embodiment

Figure 13A:
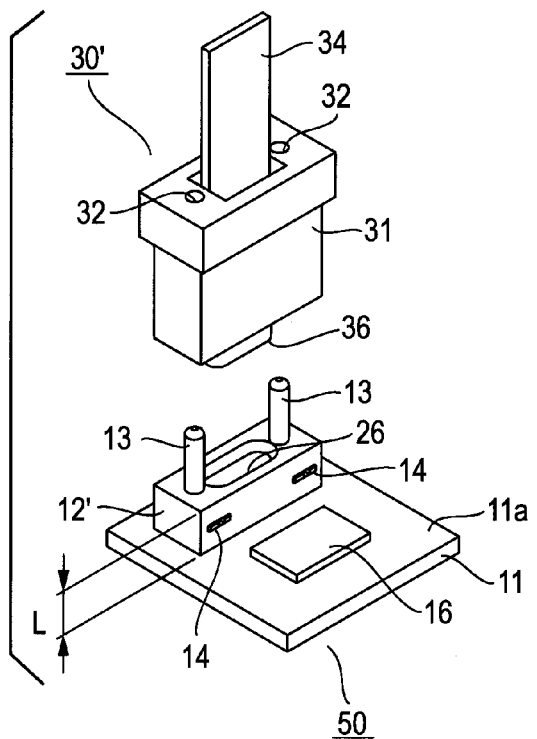
FIG. 13A is a perspective view showing the appearance of an optical module according to a third embodiment of the present invention and an MT connector.
Figure 13B:
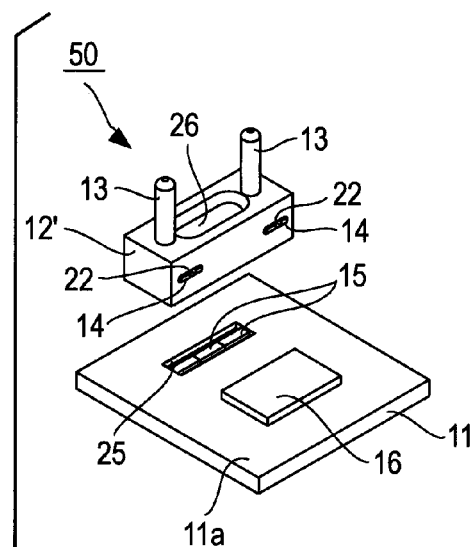
FIG. 13B is an exploded perspective view showing the optical module in FIG. 13A.
Figure 14:
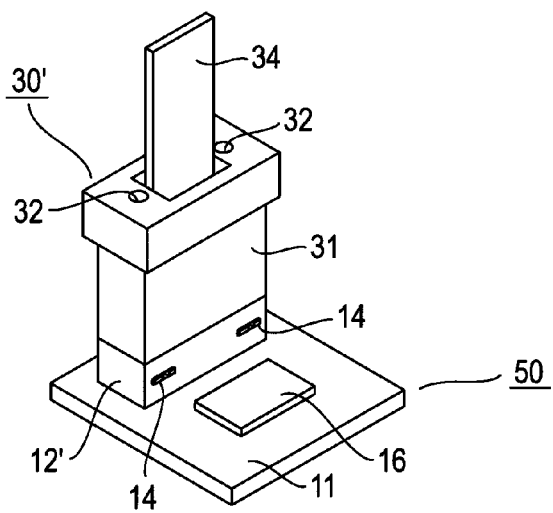
FIG. 14 is a perspective view showing the optical module and the MT connector in FIG. 13A when they have been mutually connected.
Figure 15A:
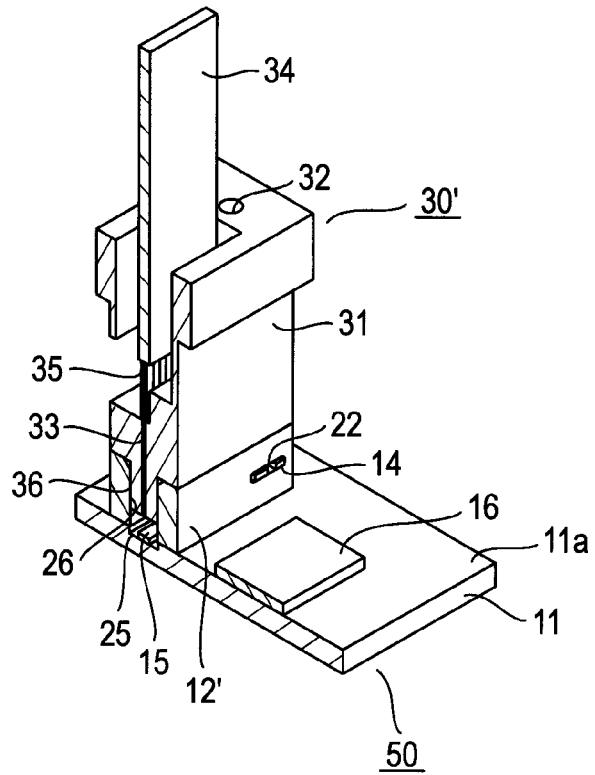
FIG. 15A is an enlarged cross-sectional view of the optical module and the MT connector in FIG. 14.
Figure 15B:
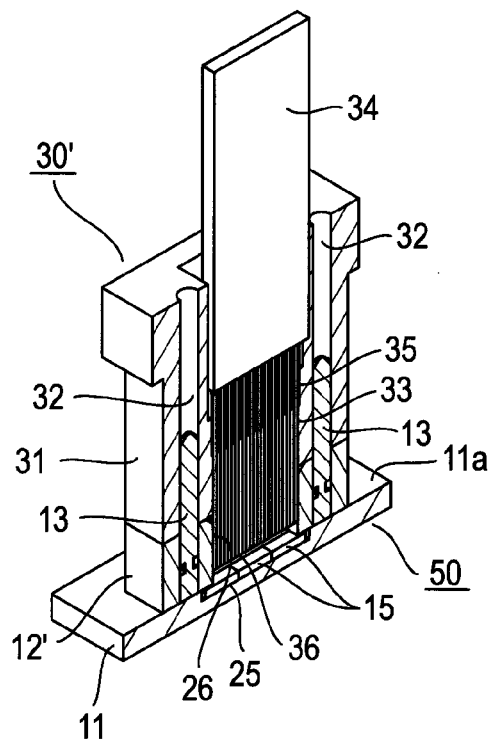
FIG. 15B is an enlarged cross-sectional view of the optical module and the MT connector in FIG. 14.

FIG. 13A shows the structure of an optical module according to a third embodiment of the present invention and an MT connector; FIG. 13B shows the optical module that has been partially dismantled. FIG. 14 shows the optical module and the MT connector when they have been mutually connected;

FIGS. 15A and 15B show the cross sections of the optical module and the MT connector when they have been mutually connected.

In this example, an MT connector 30' has a projecting section 36 at the end of (on the connection end face of) the MT ferrule 31. The end faces of the optical fibers 33 arranged and held by the MT ferrule 31 are positioned in an end surface of the projecting section 36. That is, in this example, only the part of the MT ferrule 31 that arranges and holds the optical fibers 33 projects from the other part to form the projecting section 36. The entire length in the projection direction of the projecting section 36 is shorter than the entire length L of the holding member 12' of the optical module 50.

A receiving hole 26, into which the projecting section 36 of the MT connector 30' is inserted, is drilled through in the holding member 12' of the optical module 50. Unlike the holding members 12 of the first and second embodiments described above, the holding member 12' does not arrange or hold the optical fibers 17.

In this example, the guide pins 13 of the optical module 50 are inserted into and positioned by the guide pin insertion holes 32 of the MT connector 30', the projecting section 36 of the MT connector 30' is inserted and housed into the insertion hole 26 of the holding member 12' of the optical module 50, so that the MT connector 30' and the optical module 50 are mutually connected. Since the entire length in the projection direction of the projecting section 36 is shorter than the entire length L of the holding member 12', when the MT connector 30' and the optical module 50 are mutually connected, the MT ferrule 31 makes contact with the holding member 12' and the amount of projection (at least 2.8 mm) of the guide pins 13 is surely inserted into the guide pin insertion hole 32. In this example, the optical fibers 33 of the MT connector 30' are optically connected to the optical elements 15 of the optical module 50 directly.

Fourth Embodiment

Figure 16A:
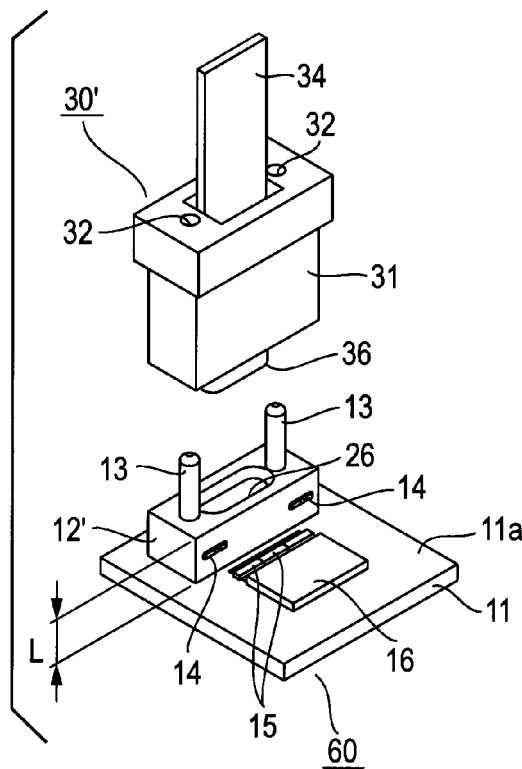
FIG. 16A is a perspective view showing the appearance of an optical module according to a fourth embodiment of the present invention and an MT connector.
Figure 16B:
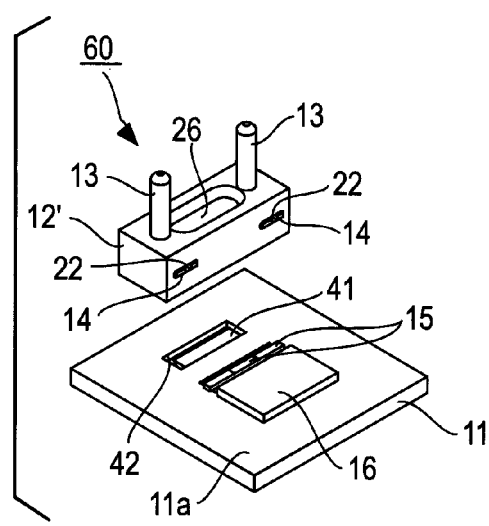
FIG. 16B is an exploded perspective view showing the optical module in FIG. 16A.
Figure 17:
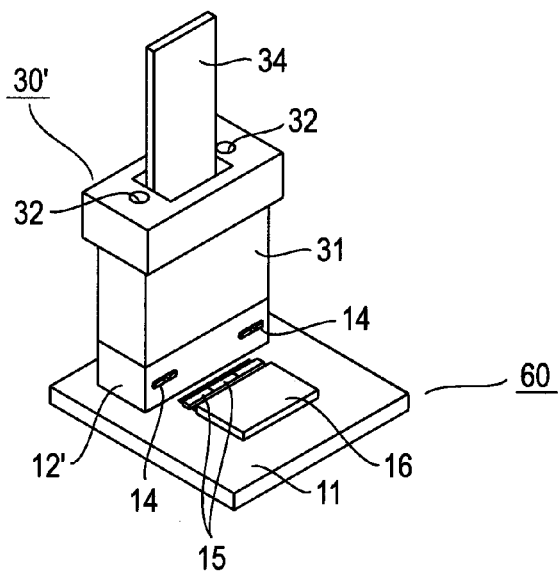
FIG. 17 is a perspective view showing the optical module and the MT connector in FIG. 16A when they have been mutually connected.
Figure 18A:
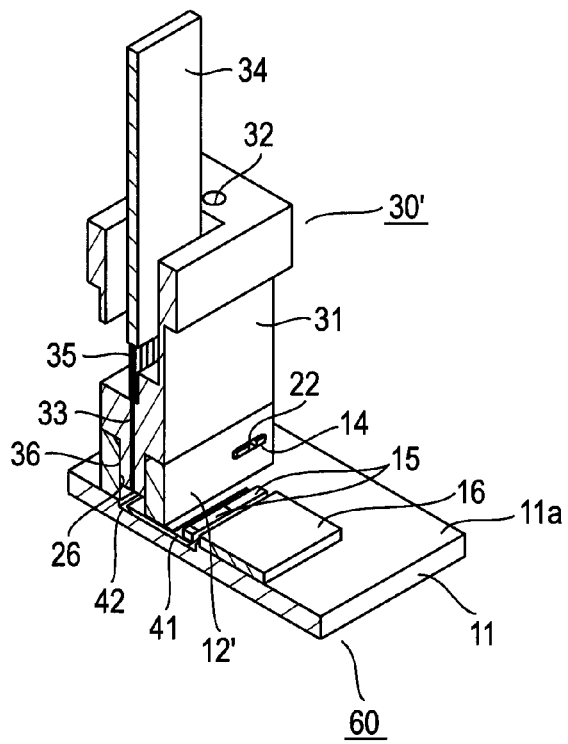
FIG. 18A is an enlarged cross-sectional view of the optical module and the MT connector in FIG. 17.
Figure 18B:
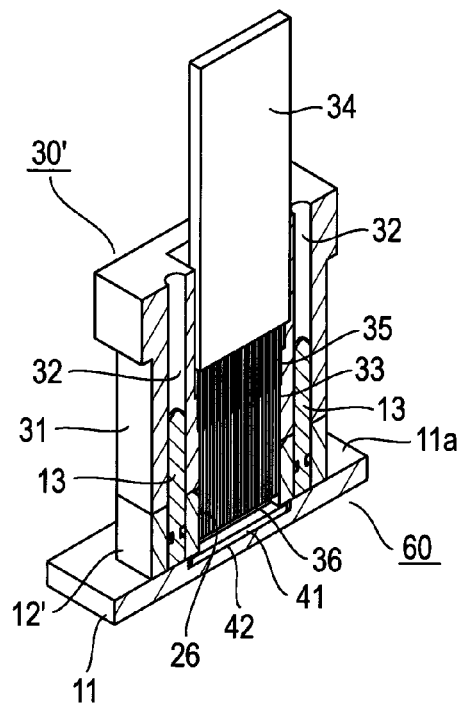
FIG. 18B is an enlarged cross-sectional view of the optical module and the MT connector in FIG. 17.
Figure 18C:
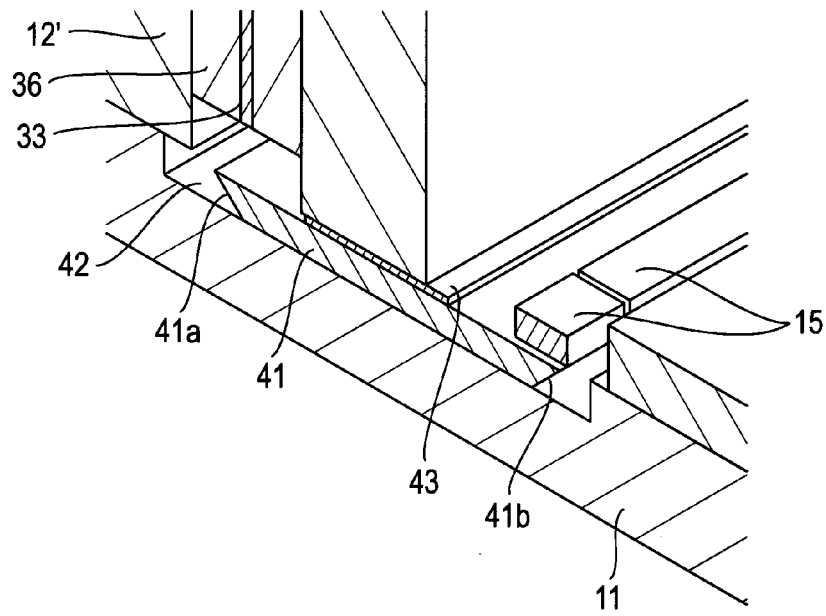
FIG. 18C is an enlarged view of a part of the connection of the optical module and the MT connector in FIG. 18A.

FIG. 16A shows the structure of an optical module according to a fourth embodiment of the present invention and an MT connector; FIG. 16B shows the optical module that has been partially dismantled. FIG. 17 shows the optical module and the MT connector when they have been mutually connected; FIGS. 18A, 18B, and 18C show the cross sections of the optical module and the MT connector when they have been mutually connected.

In this example, the structure of the substrate 11 of the third embodiment is changed and the optical module 60 has the substrate 11 in which the optical waveguide 41 is disposed in the second embodiment and the holding member 12' in which the receiving hole 26 is formed in the third embodiment.

In this example, the optical fibers 33 arranged and held by the MT connector 30' are optically connected to the optical waveguide 41 of the substrate 11 of the optical module 60 directly.

In the embodiments described above, the entire length L of the holding members 12 and 12' may be 1.9 mm, which is smaller than the entire length (2.8 mm) of the prior art, so the optical module can be downsized. The entire length L is not limited to 1.9 mm and may be set to a value of at least 1.9 mm and less than 2.8 mm.

Although the number of optical fibers arranged and held by the MT connector in the optical module is 12 and the optical fibers are optically connected, the present invention is not limited to this and, for example, the number of optical fibers 17 arranged and held by the holding member 12 and the number of optical elements 15 mounted on the substrate 11 may be determined as appropriate in relation to the corresponding MT connector.

Although the optical elements 15 are placed in the concave section 25 formed in the substrate 11 in the first and third embodiments, the optical elements 15 may be placed on the upper surface 11a of the substrate 11 without the concave section 25 being formed. In this case, it is sufficient in the first embodiment that a concave section for the optical elements 15 is disposed in the lower surface 12b of the holding member 12; it is sufficient in the third embodiment that a concave section is disposed as in the first embodiment when the receiving hole 26 is too small to house the optical elements 15.

What is claimed is:

1. An optical module that is connected to an MT connector that arranges and holds optical fibers and having a pair of guide pin insertion holes, the optical module comprising:
   a substrate;
   a holding member of resin that is secured to the substrate, has a pair of through holes drilled through the substrate in a direction orthogonal to an upper surface of the substrate, and has a first entire length in the direction of at least 1.9 mm and less than 2.8 mm; and
   a pair of guide pins that are inserted into the through holes and secured to the holding member by locking pieces;
   wherein one end section of each of the pair of guide pins is held by the holding member across the first entire length and the other end section to be inserted into one of the pair of guide pin insertion holes projects 2.8 mm or more from the holding member.

2. The optical module of claim 1, wherein slits communicating with the pair of through holes are formed in the holding member, a notch is formed in each of the pair of the guide pins, and each of the locking pieces is inserted into and held by each of the slits and mates with the notch.

3. The optical module of claim 1 or 2, wherein the holding member arranges and holds optical fibers that face and are optically connected to end faces of the optical fibers of the MT connector.

4. The optical module of claim 3, wherein an optical element is mounted in a place in the substrate that faces end faces of the optical fibers held by the holding member, the end faces facing the substrate.

5. The optical module of claim 3, wherein an optical waveguide is formed in a place in the substrate that faces the end faces of the optical fibers held by the holding member, the end faces facing the substrate.

6. The optical module of claim 1 or 2, wherein the MT connector has a projecting section on a connection end face, the end faces of the optical fibers arranged and held are located in an end surface of the projecting section, a second entire length in a projection direction of the projecting section is shorter than the first entire length of the holding member, and a receiving hole receiving the projecting section is drilled through the holding member.

7. The optical module of claim 6, wherein an optical element is mounted in a place in the substrate that faces the end faces of the optical fibers of the projecting section inserted and housed into the receiving hole.

8. The optical module of claim 6, wherein an optical waveguide is disposed in a place in the substrate that faces the end faces of the optical fibers of the projecting section inserted and housed into the receiving hole.

9. The optical module of claim 4, wherein a concave section is formed in the substrate and the optical element is placed in the concave section.

10. The optical module of claim 7, wherein a concave section is formed in the substrate and the optical element is placed in the concave section.

* * * * *